United States Patent [19]
Smith

[11] Patent Number: 6,159,100
[45] Date of Patent: Dec. 12, 2000

[54] VIRTUAL REALITY GAME

[76] Inventor: Michael D. Smith, Mellow Valley Rd. P.O. Box 983, Lineville, Ala. 36266

[21] Appl. No.: 09/065,152

[22] Filed: Apr. 23, 1998

[51] Int. Cl.[7] .................................................. A63F 13/00
[52] U.S. Cl. ................................ 463/42; 434/55; 463/25; 472/59; 472/60
[58] Field of Search ....................... 463/42, 25; 434/55, 434/29; 709/204; 472/59, 60

[56] References Cited

U.S. PATENT DOCUMENTS

| | | | |
|---|---|---|---|
| 5,662,523 | 9/1997 | Yasumaru et al. | 463/30 X |
| 5,674,128 | 10/1997 | Holch et al. | 463/42 X |
| 5,964,660 | 10/1999 | James et al. | 463/1 X |
| 5,980,256 | 11/1999 | Carmein | 434/55 X |
| 5,993,216 | 11/1999 | Stogner | 434/29 X |
| 6,007,338 | 12/1999 | DiNunzio et al. | 434/55 X |
| 6,009,460 | 12/1999 | Ohno et al. | 709/204 X |
| 6,012,926 | 1/2000 | Hodges et al. | 434/236 X |

*Primary Examiner*—Michael O'Neill
*Assistant Examiner*—Chanda Harris

[57] ABSTRACT

A virtual reality system is provided including at least one game station. Such game station has at least one virtual reality outfit equipped with a helmet having an input device for subjecting a user to visual and audio stimuli upon the receipt thereof. The outfit also has a plurality of output devices including a movement sensor for generating an output signal upon the detection of a movement of the user and an audio sensor for generating the output signal upon the detection of a vocalization of the user. Further provided is a plurality of auxiliary sensory mechanisms for subjecting the user to various feeling sensory conditions upon the actuation thereof. A server is connected to each game station and adapted to transmit the audio and visual stimuli and further actuate a predetermined number of the auxiliary sensory mechanisms as a function of the output signals of at least one game station.

11 Claims, 3 Drawing Sheets

VIRTUAL REALITY GAME

BACKGROUND OF THE INVENTION

1. Field of the Invention

The present invention relates to virtual reality gear and more particularly pertains to a new virtual reality game for simulating an interaction between a plurality of users.

2. Description of the Prior Art

The use of virtual reality gear is known in the prior art. More specifically, virtual reality gear heretofore devised and utilized are known to consist basically of familiar, expected and obvious structural configurations, notwithstanding the myriad of designs encompassed by the crowded prior art which have been developed for the fulfillment of countless objectives and requirements.

Known prior art virtual reality gear include U.S. Pat. No. 5,423,554; U.S. Pat. No. 5,432,895; U.S. Pat. Des. No. 351,622; U.S. Pat. No. 5,026,069; U.S. Pat. No. 5,422,653; and U.S. Pat. No. 5,446,834.

In these respects, the virtual reality game according to the present invention substantially departs from the conventional concepts and designs of the prior art, and in so doing provides an apparatus primarily developed for the purpose of simulating an interaction between a plurality of users.

SUMMARY OF THE INVENTION

In view of the foregoing disadvantages inherent in the known types of virtual reality gear now present in the prior art, the present invention provides a new virtual reality game construction wherein the same can be utilized for simulating an interaction between a plurality of users.

The general purpose of the present invention, which will be described subsequently in greater detail, is to provide a new virtual reality game apparatus and method which has many of the advantages of the virtual reality gear mentioned heretofore and many novel features that result in a new virtual reality game which is not anticipated, rendered obvious, suggested, or even implied by any of the prior art virtual reality gear, either alone or in any combination thereof.

Figure 2:
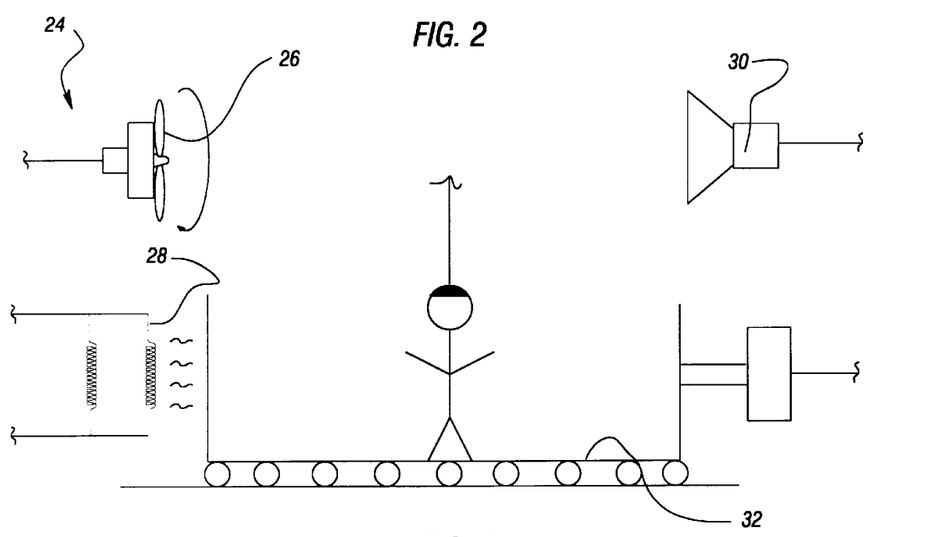
FIG. 2 is a detailed schematic diagram of the auxiliary sensory mechanisms of one of the game stations of the present invention.
Figure 3:
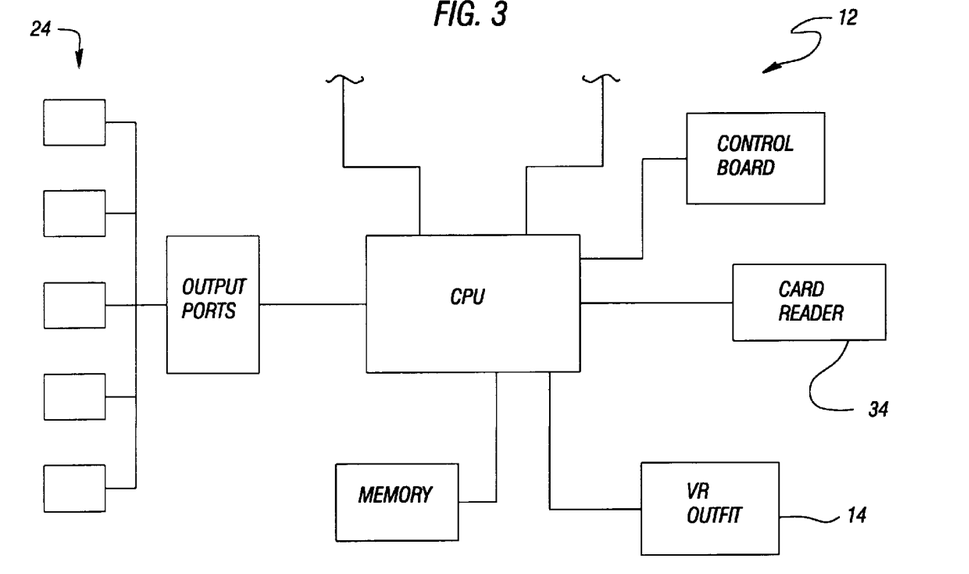
FIG. 3 is a schematic diagram of one of the game stations of the present invention.
Figure 4:
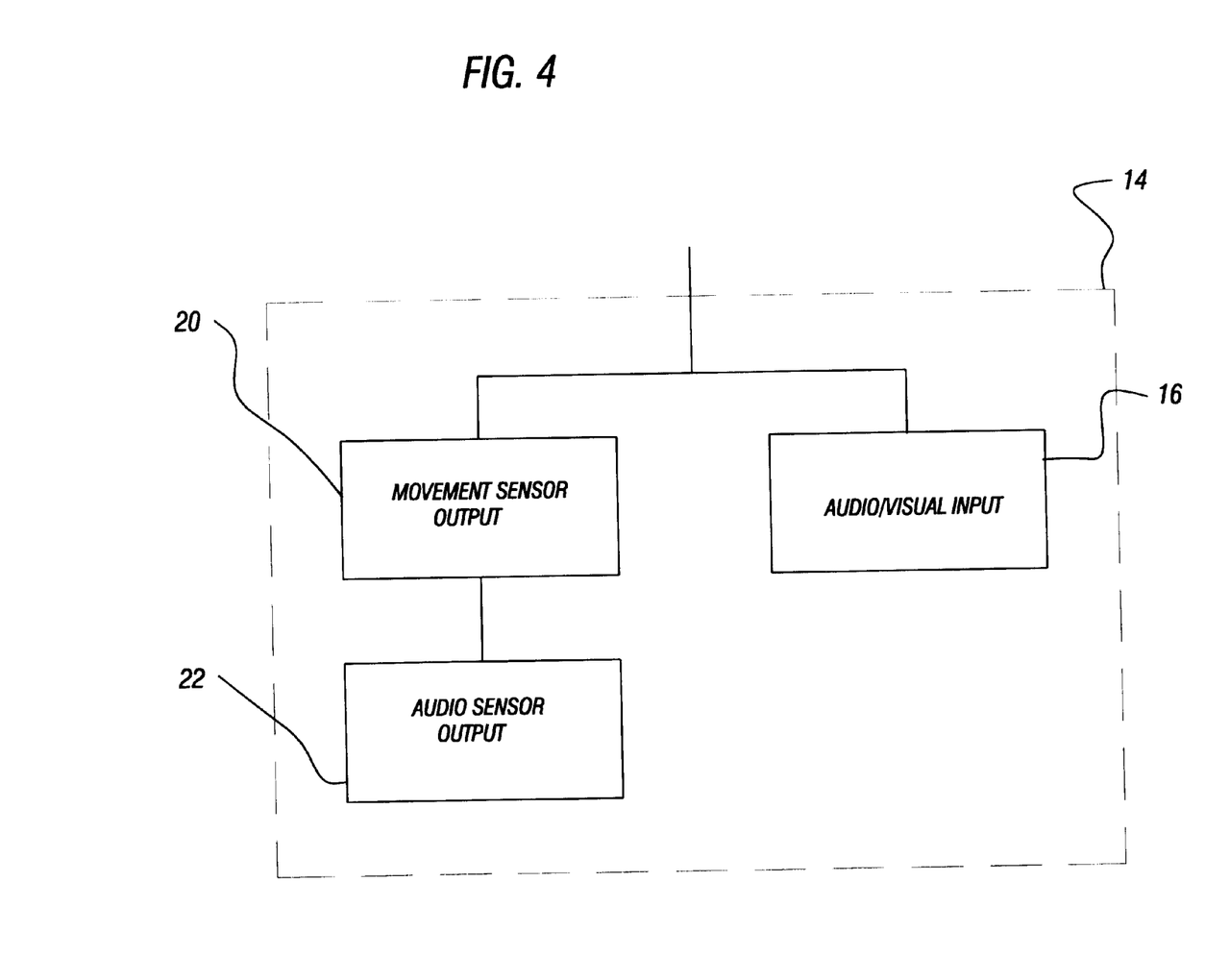
FIG. 4 is a schematic diagram of one of the virtual reality outfits of the present invention.

To attain this, the present invention generally comprises a plurality of game stations each situated remote from each other. Each game station includes at least one virtual reality outfit, as shown in FIGS. 2 & 3. FIG. 4 shows that each outfit has a helmet with an input device for subjecting a user to visual and audio stimuli upon the receipt thereof. Further, a plurality of output devices are provided including a movement sensor for generating an output signal upon the detection of a movement of the user. Also included is an audio sensor for generating the output signal upon the detection of a vocalization of the user. As shown in FIG. 2, each game station further includes a plurality of auxiliary sensory mechanisms. Such mechanisms comprise a fan situated adjacent to the user for subjecting the user to wind upon the actuation thereof. For subjecting the user to heat, a heater is situated adjacent to the user. Also situated adjacent to the user is a subwoofer for subjecting the user to low frequency audible sounds upon the actuation thereof. Finally, a vibrating floor is provided on which the user is supported. In use, the vibrating floor functions for moving the user upon the actuation thereof. Lastly, each game station has at least one card reader for removably accepting, reading, and writing on a magnetic card. For reasons that will become apparent hereinafter, each card has a unique identification code, credits and a score thereon. Next provided is a server situated distant the game stations and connected to each of the game stations over a communication network. In the preferred embodiment, each game station is connected to the communication network via a pair of modems. In use, the server is adapted to transmit the audio and visual stimuli and further actuate a predetermined number of the auxiliary sensory mechanisms via a first one of the modems as a function of each of the output signals of a predetermined number of the game stations. It should be noted that the server further operates in this manner as a function of the identification code and credits read by each card reader. The server further is adapted to transmit via a second one of the modems the audio and visual stimuli to a predetermined number of the game stations for storage in memory of the designated game stations. By this storage, such audio and visual stimuli may be used at a later time. Ideally, the stimuli transmitted over the second modem is constant environment stimuli common to each of the participating game stations. Finally, a plurality of CRT viewing screens are each connected to the server over the communication network for viewing the audio and video stimuli received by a selected one of the game stations.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new virtual reality game apparatus and method which has many of the advantages of the virtual reality gear mentioned heretofore and many novel features that result in a new virtual reality game which is not anticipated, rendered obvious, suggested, or even implied by any of the prior art virtual reality gear, either alone or in any combination thereof.

It is another object of the present invention to provide a new virtual reality game which may be easily and efficiently manufactured and marketed.

It is a further object of the present invention to provide a new virtual reality game which is of a durable and reliable construction.

An even further object of the present invention is to provide a new virtual reality game which is susceptible of a low cost of manufacture with regard to both materials and labor, and which accordingly is then susceptible of low prices of sale to the consuming public, thereby making such virtual reality game economically available to the buying public.

Still yet another object of the present invention is to provide a new virtual reality game which provides in the apparatuses and methods of the prior art some of the advantages thereof, while simultaneously overcoming some of the disadvantages normally associated therewith.

Still another object of the present invention is to provide a new virtual reality game for simulating an interaction between a plurality of users.

Even still another object of the present invention is to provide a new virtual reality game that includes at least one game station. Such game station has at least one virtual reality outfit equipped with a helmet having an input device for subjecting a user to visual and audio stimuli upon the receipt thereof. The outfit also has a plurality of output devices including a movement sensor for generating an output signal upon the detection of a movement of the user and an audio sensor for generating the output signal upon the detection of a vocalization of the user. Further provided is a plurality of auxiliary sensory mechanisms for subjecting the user to various feeling sensory conditions upon the actuation thereof. A server is connected to each game station and adapted to transmit the audio and visual stimuli and further actuate a predetermined number of the auxiliary sensory mechanisms as a function of the output signals of at least one game station.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

With reference now to the drawings, and in particular to FIGS. 1 through 4 thereof, a new virtual reality game embodying the principles and concepts of the present invention and generally designated by the reference numeral 10 will be described.

The present invention, as designated as numeral 10, includes a plurality of game stations 12 each situated remote from each other. Each game station includes at least one virtual reality outfit 14, as shown in FIGS. 2 & 3. FIG. 4 shows that each outfit has a helmet with an input device 16 for subjecting a user to visual and audio stimuli upon the receipt thereof. Further, a plurality of output devices 18 are provided including a movement sensor 20 for generating an output signal upon the detection of a movement of the user. Also included is an audio sensor 22 for generating the output signal upon the detection of a vocalization of the user. It is imperative that the output signals be specific so as to identify a specific vocalization and movement. It should be noted that in addition to the virtual reality suit, external sensors, such as scanners, may be employed to accomplish similar objectives.

As shown in FIG. 2, each game station further includes a plurality of auxiliary sensory mechanisms 24. Such mechanisms comprise a fan 26 situated adjacent to the user for subjecting the user to wind upon the actuation thereof. For subjecting the user to heat, a heater 28 is situated adjacent to the user. Also situated adjacent to the user is a subwoofer 30 for subjecting the user to low frequency audible sounds upon the actuation thereof. Finally, a vibrating floor 32 is provided on which the user is supported. In use, the vibrating floor functions for moving the user upon the actuation thereof.

Lastly, each game station has at least one card reader 34 for removably accepting, reading, and writing on a magnetic card. For reasons that will become apparent hereinafter, each card has a unique identification code, credits and a score thereon.

Next provided is a server 36 situated distant the game stations and connected to each of the game stations over a communication network 38. In the preferred embodiment, each game station is connected to the communication network via at least a pair of modems 40. It should be noted that additional modems and phone lines may be added in order to afford the necessary data transfer capacity.

In use, the server is adapted to transmit the audio and visual stimuli and further actuate a predetermined number of the auxiliary sensory mechanisms via a first one of the modems as a function of each of the output signals of a predetermined number of the game stations. It should be noted that the server further operates in this manner as a function of the identification code and credits read by each card reader. In other words, the server utilizes the identification code to identify the source of the output signals.

A character associated with each user may be picked prior to play. Further, interaction between various distant users may be simulated in a similar environment and monies may be collected in an efficient manner similar to conventional video games. During play, points of each user may be deducted as a function of the output signals, or actions of a user. Further, previous actions and scores of specific users may be tracked for later use.

The server further is adapted to transmit via a second one of the modems the audio and visual stimuli to a predetermined number of the game stations for storage in memory of the designated game stations. By this storage, such audio and visual stimuli may be used at a later time. Ideally, the stimuli transmitted over the second modem relates to constant environment stimuli common to each of the participating game stations. With the central control of the server, a common theme may be established between all of the game stations.

Finally, a plurality of CRT viewing screens 42 are each connected to the server over the communication network for viewing the audio and video stimuli received by a selected one of the game stations. This allows users without a virtual reality outfit to view the actions of the users of the game stations.

It should be noted that in various alternate embodiments, only a single game station may be included with a plurality of virtual reality outfits and an on-site server. In such embodiment, the requirement for the communication network and modems is obviated.

While a sufficient description of the necessary hardware has been set forth, further details relating to the use of the present invention will now be set forth, thereby rendering apparent the nature of the output signals and stimuli and further the method of actuation of the auxiliary sensory mechanisms. It should be understood that the following description of a possible use of the present invention is only an example and may readily be substituted if desired.

Player Imaging:

What you see through the helmet/glasses when you raise your arms or legs or look down at your body is of course a digitized image of yourself. Prior to competing, you may be able to select a character with his corresponding costume/gi and background from the selected list. You may also be able to name the character yourself, and choose certain characteristics for him/her. The appearance of the Warrior universe could be scaled to fit nearly anyone. For instance, the graphical interface should be made so that a four foot tall person could be able to see from the perspective of a six foot tall character, which would be necessary to keep within the measurements of some characters.

Gameplay:

The intricate details of this extremely physical simulator are based on technology that has been in development for some time.

First, you don the equipment and step into the arena. What you see and hear at first in the helmet will depend on some basic choices you have made shortly before entry. These are outlined as follows:

PLAYER MOVEMENT

Most of the truly unique movement in the Virtual Warrior universe would be enhanced and necessary for the most part by use of the apparatus dubbed ARTIMUS. The possibility for enhanced humanoid and/or virtual vehicle movement is due to what has been named the Inverted Joystick Principle.

Inverted Joystick Principle

Most video games have been played by a person manipulating a stick, control pad, mouse, steering wheel, or other input device in combination with buttons or sometimes pedals to move an object around a screen or appear to move through an environment from a first person perspective. With the Inverted Joystick Principle, your entire body does the job usually done by the hands in most games. When you are securely strapped into an ARTIMUS, you can push slightly in a direction while moving your legs in the appropriate manner and your point of view will change accordingly. (This can be accomplished by what is called analog control.) The more you push and move your legs, the more your character responds within given parameters as described in the character BIOS. This configuration makes it possible to give the illusion of walking, sidestepping, running backwards and jumping longer distances than you would normally be able. It will also enable you to do somersaults, cartwheels, spin kicks, sweeps, flying kicks and other moves which the average person does not have the balance, confidence, or capability to do in real life. The difficulty setting could adjust how much control the unit will give, so that even an inexperienced person may be able to perform realistic kicking and punching techniques and more confident players could have a "loose" feel to hone their skills.

Note: This could also be used to give a more "dramatic" effect to certain techniques, such as a certain slow motion effect for a high jump kick. Keeping your leg extended for a couple of more seconds might enable you to almost "float" to the ground in a surreal time with your opponent, like in the movies. It could also give you the opportunity to do devastating combination moves that would be near impossible to do in real life.

CHARACTER SELECTION

There are to be at least six playable character types for the Virtual Warrior universe with the possible addition of more at a future date. They have skills and abilities that are partly dependent on your personal physical strengths and abilities.

Hit Points

Each character has a certain number of hit points that are subtracted with battle damage or certain spells. They can be replenished and sometimes added to more than the original amount by certain objects or spells that affect that character. The amount of life left can be viewed by a health meter, "aura," or actual simulation of blood and bruises, to show an opponent's condition.

Perception/Vision
  0. Completely blind. The only time you will experience this is with certain spells or battle damage. The effects are temporary.
  1: Near blindness. This can be due to fog, smoke, spells or battle damage. Duration depends on your location and/or recovery rate.
  2: A Perception of 2 is similar to a person with 20/70 (near normal)vision.
  3: Level 3 is the same as a person with 20/20 vision. This would be the default setting for all playable characters when they first start.
  4: Level 4 is equivalent to 20/20 vision plus enhanced night vision. (objects will be faintly visible in near total darkness that would not be with normal vision. Occasional spiritual contact is possible by the whim of the entity.)
  5: Level 5 allows one to clearly see objects in near total darkness (usually only possible with night vision goggles, or some sort of spell for most characters) Occasional spiritual summoning is possible dependent on spirit power and character 6: A perception level of 6 allows a player to see through standard walls, what other characters have in inventory, and the ability to see into the spirit realm. (also depends on spirit power.) A warrior class character does not usually attain level 6 without some kind of assistance.

Agility

This is what determines how fast and how well you run, jump, strike, and depending on character, fly. Certain upgrades add to this ability. It is inversely related to stealth. Each character has a certain amount of running speed determined in part by the players' movements. Agility can be affected by injury, health, enhancement objects or upgrades, or spells. Some characters start out with more than others.

Agility Levels
- 0: This only happens when you are severely injured, affected by a spell, knocked out, or dead.
- 1: You are only able to walk or crawl slowly.
- 2: You are able to walk quickly.
- 3: You are able to run slowly. (about 3–5 mph)
- 4: You are able to run at a quick pace (5–7 mph) and jump about 2–3' in any direction.
- 5: You are able to run at a good speed (7–10 mph) and jump about 3–4' in any direction your torso is facing.
- 6: You are able to run fast (10–14 mph) and jump 5–10' toward the direction you are facing depending on your energy levels. If your character flies you can travel up to about 25 mph.
- 7: You are able to run very fast (14–20 mph) and jump 10–20' horizontally wherever you are facing, and 10' upwards. If your character flies, you will be able to travel between 50–75 mph for a brief period with certain spells and/or upgrades.

Spirit Energy

This is like a reserve amount of health and/or strength to some players and a reservoir and channel for magic for others. A character starts off with a certain amount, and may increase the maximum amount depending on various upgrades, may be built up slowly over time depending on character, and may also be built up by certain combinations of buttons on the equipment and/or movements that you make.

STEALTH ABILITY

Certain characters are able to gain access to areas that are especially difficult for other characters to maneuver without being detected. These characters may also be able to disguise themselves in order to infiltrate territory and gain information or objects. Stealth can be increased by better equipment, and learning disguise methods. (Not available for everyone.)

- 0: Your equipment/vehicle makes noise when you move, or you just stand out like a sore thumb.
- 1: Your footsteps are audible when you move on most surfaces, and clothing and equipment also makes noise when you move. If you move fast enough, you may catch an opponent off guard.
- 2: Your steps are not as loud, but equipment is still a bit noisy.
- 3: You are able to come to within ten feet of most characters undetected, if you move slowly enough.
- 4: You are able to come to within two to five feet of a character depending on who you are, and can enter about 50% of structures without sounding alarms.
- 5: Stealth ability of 5 enables a character to move soundlessly. The ability to enter buildings without tripping alarms is between 65–75% successful if you are cautious. Attaining a rating of 5 may also increase perception. Some disguise ability is available.

Stealth levels between 5 and 10 will enable you to disguise yourself to certain characters unless you attack them. Between 10 and 15, a character may have the ability to teleport to a location depending on the character abilities and the amount of remaining spirit energy.

- 6: Move soundlessly, 70–80% structure entrance with no alarm, good camouflage and disguise ability. Walk normally during the day. (At night, if spotted and given a chance to run and hide, if you don't move, maybe they won't see you at night 50% of the time.)
- 7: Soundless movement increased agility, 75–85% structure entrance with no alarm, medium camouflage and disguise ability. Walk normally among enemies during daylight. (You may be spotted or recognized only 30–40% of the time at night, most likely by characters with perception ability of at least 4.)
- 8: Soundless movement increased agility, 80–90% structure entrance with no alarm, great camouflage and disguise. You may be able to converse with some known enemies and other players via a voice alteration unit. (You may be spotted only 20–30% of the time by characters with perception ability of 5 or more.
- 9: Soundless movement, increased agility, 90–95% structure entrance with no alarm, excellent camouflage and disguise. You may be able to infiltrate, converse with and/or assassinate leaders of various enemy factions at this level. You may appear as a mist to some characters. Your chances of being spotted at night are only 10% with characters having perception of at least 5.
- 10: You move soundlessly, your agility is at least 6. You have the power of invisibility if you do not attack. Due to energy constraints, you are only allowed this ability for a short time while your spirit energy or your bio-suit recharges. Infrared scanners may detect you if you do not have heat shielding.

VIRTUAL WEAPONS

Most weapons can be used by most characters, and may be taken upon the death or disability of the character who is using it. Certain characters may have a bit of influence as factor according to size, skills, and reputation.

- Dagger: Used by thieves, some magic users, and ninjas
- Club: Usually used by the more primitive types, and may decrease some character's agility if they try to use it.
- Staff: Can be used by most anyone, and upgraded with talismans or blades
- Wakizashi: Standard medium sword. Most popular with ninjas
- Broadsword: Preferred by fighters and warriors.
- Energy Spear: Medium range, long charge. Can be recharged with dalovian crystal.
- 10 mm Semi-auto Pistol: 15 round clips can be found or bought in various locales.
- 11 mm Auto Shnazza: 30 round attained in the same way.
- Grenade launcher: 5 rounds when found. Ammo may be found in packs of 5
- Shock blaster: Temporary paralysis and/or disorientation in some characters. Loss of energy in others.
- Molecular Disrupter: Causes chaos in the body's natural rhythms. May cause one or more of the following in certain characters except for mages and sorcerers:
  loss of perception to the point of blindness
  loss of agility
  slowed recovery or loss of energies
  loss of stealth abilities All effects are temporary, and the weapon takes a few seconds to recharge after firing.

- Staff of Gulan: The magic contained in this staff can only be tapped by those who practice the arcane arts. Any one else would only be able to use it as a bludgeoning weapon.

HAND TO HAND SCENARIO

If you have chosen a strictly hand to hand scenario, surrounding scenery can be selected have a choice of locales as an addition to the arena environment to wage your vendetta. If observation monitors are installed, spectators can watch you in the arena and at the same time your computer-generated body is broadcast on the screen(s) as you assume the role of your character.

Computer Character Imaging:

The actual appearance of other characters through the helmet will of course depend on your proximity, direction your head is tilted, amount of damage that has been inflicted, etc. This is discussed in more detail in later sections.

SCENERY

If you're going to pick a fight, it's nice to choose the turf you'll be battling on. The size and appearance of the area will depend on what you and/or your human opponent(s) agree on. Or it could be a two against one vote or random selection, for example. There are sometimes more boundaries than other times. In the adventure scenarios, your character starts out in a certain location, and your progress determines subsequent vistas. For example, you may start off on one planet at the same time as your teammate begins on earth. Events could happen to bring you together and you could choose to be enemies provide more challenge to each other or be allies and attempt to finish your quest together if your scenario goals permit. It may be helpful to agree on scenario goals before beginning or choosing characters from the same planet before actually playing.

DOJO/TRAINING ROOM

There would be a training room to correspond to each of the main characters.

MEAN STREETS

These are challenging levels complete with vehicles, fire hydrants, and the types of characters you would expect to find in the more run down areas of our major cities. You can pick up trash cans, bottles, bricks, or even bystanders depending on your character's strength and use them as weapons in these levels. Actual overhead map footage might be useful in crafting this part of the environment. For created cities of other planets, of course different props and creatures would be available.

Wastelands

This could be the barren expanses of terrain on any planet that will support the life of selected characters. Gravity affects fighting skills, as some planets will exert a greater force than others.

Tournament Arena

There can be a variety of these, some with walls, barriers and weapons, and some without. Rendered crowds would add to the energy level, with some of the audience members also being playable characters. More than two players fighting at once can be an exciting option.

SKILL LEVEL

BEGINNER INTERMEDIATE ADVANCED MASTER

If you choose BEGINNER, you will be given the Following choices:

LESSON? TRAINING? FIGHT!

Choosing LESSON? brings the corresponding Advisor for your character into the arena to quickly show you the fundamentals of the game. The scenery will be the corresponding dojo training ground that relates to the character history. The first lesson is defense. (It's assumed you know how to throw a punch before you step in here!) You are instructed to raise your arm. Of course, you will see a digitized image of your raised arm through the helmet. (See player imaging for more detail.) The Advisor will strike your arm and say "this is how you defend." An accompanying sound of impact will demonstrate when a successful block is made. After a few successful attempts, the Advisor will say "This is what happens when you are hit" Another sound effect to illustrate the point, and depending on the strength of the hit, an appropriate visual display. Jabs or other "soft" hits will only cause a sound effect. A medium strike produces a "jarring" visual effect with subsequent temporary scrolling and pitch adjustment. A hard hit will produce "jarring" and temporary "field distortion" which may include a "haze" effect "red spots" (to simulate eye swelling) "double vision" etc. An extremely hard hit may result in any of the above and/or a total field of vision change.*

* (Explained in more detail in the FALLS section.)

After a brief demonstration of the types of hits, the Advisor will say "This is what happens when you are knocked down." He will perform a move that in real life, if performed between to fighters, could result in one of them being knocked to the ground. This will give the point of view of being knocked on your backside looking forward, on your back looking up, or flat on your face with a nice view of the mat (or whatever surface happens to be chosen for graphic imaging for that training area."

Next, he will say "Strike." This gives you a chance to get accustomed to the appropriate distance for efficient hits. If you are too far away, he will say "Come closer." If you get too close, he will say "This is not wrestling. Move back."

TRAINING

SPAR ALONE

Choosing TRAINING basically just gives you a minute or two to warm-up before facing your first opponent.

Choose SPAR to go briefly with the Adviser before your first opponent. You don't lose any energy and it gives you a chance to warm up and adjust to the nuances of this particular virtual environment, Choosing ALONE is self explanatory. You can parade around the arena doing a few punches and kicks, showing your moves to the crowd before beginning the contest.

FIGHT!

If you are in an arena, you go to one side of the arena, and your opponent will appear through a "doorway" or other apparatus on the other side.

INTERMEDIATE

Choose this and you get the same TRAINING options, but the skill level is slightly more difficult.

ADVANCED

This skill level is recommended for people who know what they're doing.

Weak punches and kicks will not be efficient. You still get some warm up time to get ready. You'll probably need it.

MASTER

It is recommended that anyone who considers playing at this level is in excellent physical health, as most of the computer generated opponents would be made sufficiently more difficult to defeat, by the use of an aggressive Artificial Intelligence structure. Given the fact that a computer is not going to have the problems of accelerated heart rate and oxygen debt to contend with, any person who attempts this level would have to be made to understand the importance of extreme caution if they are to try to "win" at this level. For example, only attempting to go up against one opponent in one session, and being able to continue at a later date would be desirable to help alleviate the problems of soreness and fatigue.

In real life, a true martial arts master has control over his mind and body and is ready for action at any given moment. So no warm up will be provided. One should be prepared for an extreme physical workout on this level.

FALLS

In order to make gameplay as realistic as possible while avoiding the risk of injury that is possible in actual combat, it has been attempted to devise a combat simulation theory that would hopefully be logical and entertaining.

When an opponent generates enough force to knock your character down, it will cause the ARTIMUS to shake and rotate in the appropriate manner to simulate a knockdown. In this way, you would be tilted backwards and lowered towards the surface in order to have a view of the sky or ceiling as in a real knockdown. It opens the possibility of "rolling with the punches" or falling in a way that conserves energy (just as martial artists are taught to fall in a such a way as to avoid injury.) One of the choices in the beginning could be whether to have your virtual character automatically get back up, or if you have to make the motion to right yourself. Some interesting techniques can be performed on the ground (or in getting up) making for more exciting gameplay for more physical players.

PUNCHING AND KICKING

Figure 1:
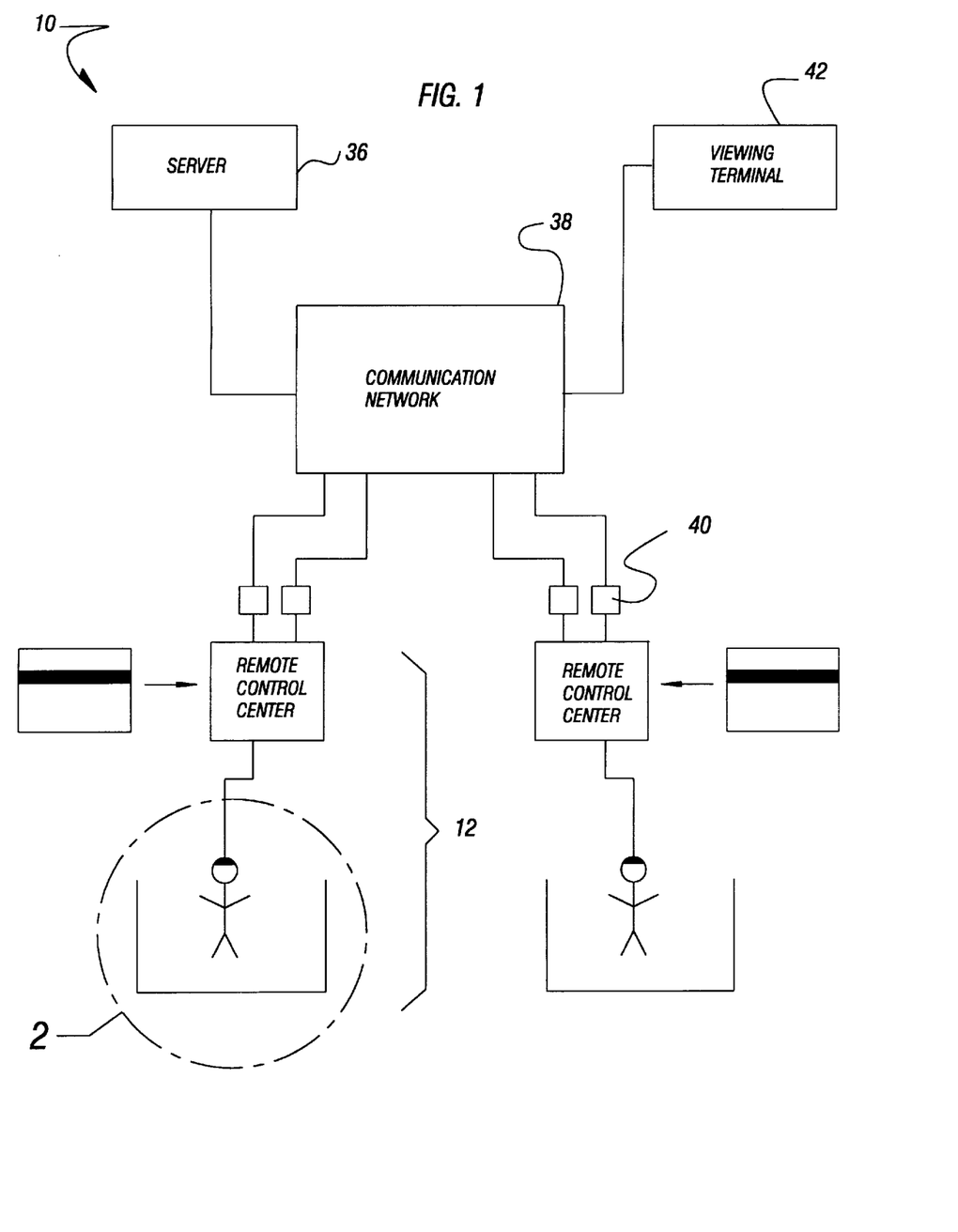
FIG. 1 is a general schematic diagram of a new virtual reality game according to the present invention.

A famous martial artist once said "sometimes a punch is just a punch." While for the most part this is true, there are important variables to consider before a punch or kick can be effective in a virtual environment. One of these is whether the computer-generated character is close enough to be affected. An example is other games with first-person perspective where when you press the button to punch, kick, hack, etc. the computer opponent (or just opponent) will block out a good portion of the screen to simulate being "in your face" so that you can register a hit. The same is true in this case. The difference is that the playing field is obviously larger due to the helmet monitor capacity. If a 180 degree field of vision in the helmet/glasses can be adopted, the sense of being "in there" will be greatly enhanced. The amount of damage done to the opponent would of course depend to some extent on your own skill level with regards to real-time fighting ability, proximity to opponent's body, SKILL LEVEL chosen, etc. Speed and power generated by punches, kicks, lateral body movement, etc. would be monitored by infrared sensors. FIG. 1. Your ability to cause damage is of course dependent on your ability to keep visual contact with your opponent and maintain the proper distance for your particular technique to be effective. Leg sweeps, for example could cause your opponent to fall or he may step back, side step, jump etc. depending on the SKILL LEVEL, how many times you've tried them, and of course the speed and strength with which you perform them this way, people who specialize in repetitive playing techniques (such as a person who constantly performs foot sweeps or low kicks) would be discouraged from doing the same thing over and over.

SPECIAL MOVES

There would probably be little or none at the BEGINNER level, The novice gamer may not be overly concerned about "special moves" They may be more satisfied with landing good normal blows at first. But with the ARTIMUS their "normal" moves can be greatly enhanced, At the INTERMEDIATE level and above however, it is assumed that you have the basic offense/defense capabilities and can add to the edge of your arsenal.

A basic special move could involve having your hands cupped as if you are pushing something towards your opponent while simultaneously letting loose a corresponding grunt or spirit yell which sends a ball of energy towards the opponent to cause damage. Tapping one of the buttons on the headgear may help to accomplish this. FIG. 3 This could also build up or drain your spirit power meter accordingly. You can save up energy and maybe even throw a large energy blast depending on your character and the techniques available.

Invoking these special powers would most likely involve simple hand gestures (similar to a magician tapping the magic hat, but in this case the taps could be performed on the headgear. For example, 1 or 2 taps on your chest could invoke power for a chi enhanced strike.)

INVISIBILITY

For this trick to truly dazzle spectators, the spectator area could possibly be configured so that you could only see what the operator wanted you to see in the arena. This might call for restricted-access viewing (monitors only) or something similar. An invoking technique could be to brush the eye area with your hands and/or press one of the corresponding buttons on the head unit. (of course only ninja or magic users would be able to use this technique.)

FLAMING KICK

This might be invoked by one or two taps on your leg or chest. Even when blocked, it will still take some energy.

TELEPORTATION

Again the magic would be done entirely through the monitors and might necessitate spectators not being able to see into the actual arena. It would of course involve a point of view change equidistant from where you are actually standing/lying.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A virtual reality system comprising, in combination:
   a plurality of game stations each situated remote from each other and including:

at least one virtual reality space for being occupied by a user, the virtual reality space having a floor surface for supporting the user and outer boundaries of the virtual reality space, the floor surface extending to the outer boundaries of the virtual reality space;

at least one virtual reality outfit having a helmet with an input device for subjecting the user in the virtual reality space to visual and audio stimuli upon the receipt thereof and a plurality of output devices including a movement sensor for generating an output signal upon the detection of a movement of the user in the virtual reality space and an audio sensor for generating the output signal upon the detection of a vocalization of the user in the virtual reality space, a plurality of auxiliary sensory mechanisms for affecting an environment of the user in the virtual reality space the auxiliary sensory mechanisms including a fan situated adjacent to the virtual reality space for subjecting the user to wind upon the actuation of the fan, a heater situated adjacent to the virtual reality space for subjecting the user to heat upon the actuation of the heater, a subwoofer speaker situated adjacent to the virtual reality space for subjecting the user to low frequency audible sounds upon the actuation of the subwoofer speaker, and a vibrating floor for vibrating the floor surface on which the user is situated in the virtual reality space for moving the user upon the actuation of the vibrating floor when the user is at any position within the outer boundaries of the virtual reality space, and a card reader for removably accepting, reading, and writing on a card having a unique identification code and credits stored thereon;

a server situated remote from the game stations and connected to each of the game stations over a communication network via a pair of modems, the server being adapted to transmit the audio and visual stimuli, the server being adapted to actuate a predetermined number of the auxiliary sensory mechanisms via a first one of the modems as a function of each of the output signals of a predetermined number of the game stations and further as a function of the identification code and credits read by each card reader, the server further being adapted to transmit via a second one of the modems the audio and visual stimuli to a predetermined number of the game stations for storage in memory of the designated game stations; and a plurality of CRT viewing screens each connected to the server over the communication network for viewing the audio and video stimuli received by a selected one of the game stations.

2. A virtual reality system comprising:

at least one game station including:

at least one virtual reality space for being occupied by a user, the virtual reality space having a floor surface for supporting the user and outer boundaries of the virtual reality space, the floor surface extending to the outer boundaries of the virtual reality space;

at least one virtual reality outfit having a helmet with an input device for subjecting the user in the virtual reality space to visual and audio stimuli upon the receipt thereof and a plurality of output devices including a movement sensor for generating an output signal upon the detection of a movement of the user in the virtual reality space and an audio sensor for generating the output signal upon the detection of a vocalization of the user in the virtual reality space; and a plurality of auxiliary sensory mechanisms for subjecting the user to various feeling sensory conditions upon the actuation of the mechanisms; and a server connected to each game station and adapted to transmit the audio and visual stimuli and further actuate a predetermined number of the auxiliary sensory mechanisms as a function of each of the output signals of the game station.

3. A virtual reality system as set forth in claim 2 wherein the auxiliary sensory mechanisms include a fan situated adjacent to the virtual reality space for subjecting the user to wind upon the actuation of the fan.

4. A virtual reality system as set forth in claim 2 wherein the auxiliary sensory mechanisms include a heater situated adjacent to the virtual reality space for subjecting the user to heat upon the actuation of the heater.

5. A virtual reality system as set forth in claim 2 wherein the auxiliary sensory mechanisms include a subwoofer speaker situated adjacent to the virtual reality space for subjecting the user to low frequency audible sounds upon the actuation of the subwoofer speaker.

6. A virtual reality system as set forth in claim 2 wherein the auxiliary sensory mechanisms include a vibrating floor for vibrating the floor surface on which the user is situated in the virtual reality space for moving the user upon the actuation of the vibrating floor when the user is at any position within the outer boundaries of the virtual reality space.

7. A virtual reality system as set forth in claim 2 and further included as a component of each game station a card reader for removably accepting, reading, and writing on a card having a unique identification code and credits stored thereon, whereby the server is adapted to transmit the audio and visual stimuli and further actuate a predetermined number of the auxiliary sensory mechanisms as a function of each of the output signals of a predetermined number of the game stations and further as a function of the identification code and credits read by each card reader.

8. A virtual reality system as set forth in claim 2 as set forth in claim 2 wherein a plurality of game stations are provided and are situated remote from each other and are further connected via a communication network.

9. A virtual reality system as set forth in claim 8 wherein each game station is equipped with a pair of modems.

10. A virtual reality system as set forth in claim 9 and further included is at least one viewing screen connected to the server over the communication network for viewing the audio and video stimuli received by a selected one of the game stations.

11. A method of participating in a virtual reality system comprising the steps of:

providing a plurality of game stations each situated remote from each other and including:

at least one virtual reality space for being occupied by a user, the virtual reality space having a floor surface for supporting the user and outer boundaries of the virtual reality space, the floor surface extending to the outer boundaries of the virtual reality space;

at least one virtual reality outfit having a helmet with an input device for subjecting the user in the virtual reality space to visual and audio stimuli upon the receipt thereof and a plurality of output devices including a movement sensor for generating an output signal upon the detection of a movement of the user in the virtual reality space and an audio sensor for generating the output signal upon the detection of a vocalization of the user in the virtual reality space, a plurality of auxiliary sensory mechanisms for affecting an environment of the user in the virtual reality space, the auxiliary sensory mechanisms including a fan situated adjacent to the virtual reality space for subjecting the user to wind upon the actuation of the fan, a heater situated adjacent to the virtual reality space for subjecting the user to heat upon the actuation of the heater, a subwoofer speaker situated adjacent to the virtual reality space for subjecting the user to low frequency audible sounds upon the actuation of the subwoofer speaker, and a vibrating floor for vibrating the floor surface on which the user is situated in the virtual reality space for moving the user upon the actuation of the vibrating floor when the user is at any position within the outer boundaries of the virtual reality space, and a card reader for removably accepting, reading, and writing on a card having a unique identification code, credits and a score thereon;

providing a server situated remote from the game stations and connected to each of the game stations over a communication network via a pair of modems, the server being adapted to transmit the audio and visual stimuli, the server being adapted to actuate a predetermined number of the auxiliary sensory mechanisms via a first one of the modems as a function of each of the output signals of a predetermined number of the game stations and further as a function of the identification code and credits read by each card reader, the server further being adapted to transmit via a second one of the modems the audio and visual stimuli to a predetermined number of the game stations for storage in memory of the designated game stations;

providing a plurality of CRT viewing screens each connected to the server over the communication network for viewing the audio and video stimuli received by a selected one of the game stations;

picking a character associated with each user situated at the game stations;

deducting and tracking points of each user as a function of the output signals; and storing a current number of points associated with each user on the card thereof.

* * * * *